United States Patent
Rainville et al.

(10) Patent No.: US 8,877,397 B2
(45) Date of Patent: Nov. 4, 2014

(54) METHOD TO THAW FROZEN COOLANT IN A FUEL CELL SYSTEM

(75) Inventors: Joseph D. Rainville, Caledonia, NY (US); Joseph C. Gerzseny, Spencerport, NY (US); Aaron Rogahn, Rochester, NY (US); Matthew C. Kirklin, Coleman, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 932 days.

(21) Appl. No.: 12/895,298

(22) Filed: Sep. 30, 2010

(65) Prior Publication Data

US 2012/0082914 A1 Apr. 5, 2012

(51) Int. Cl.
*H01M 8/04* (2006.01)

(52) U.S. Cl.
CPC . *H01M 8/04* (2013.01); *Y02E 60/50* (2013.01)
USPC .......................................... 429/429; 429/427

(58) Field of Classification Search
USPC .................................. 429/429, 408, 427, 433
See application file for complete search history.

(56) References Cited

U.S. PATENT DOCUMENTS

2007/0224462 A1* 9/2007 Limbeck .................... 429/12

* cited by examiner

*Primary Examiner* — Mark F Huff
*Assistant Examiner* — Monique Wills
(74) *Attorney, Agent, or Firm* — John A. Miller; Miller IP Group, PLC

(57) ABSTRACT

A method for increasing the temperature of a cooling fluid used to control the temperature of a fuel cell stack at a system freeze start-up. The method includes determining that the cooling fluid is frozen or nearly frozen, and if so, deactivating excessive power draw on the fuel cell stack to minimize stack waste heat and activating a cooling fluid heater to heat the cooling fluid. Once it is determined that the cooling fluid is not frozen or is flowing, then the method initiates a normal system start-up.

20 Claims, 2 Drawing Sheets

METHOD TO THAW FROZEN COOLANT IN A FUEL CELL SYSTEM

BACKGROUND OF THE INVENTION

1. Field of the Invention

This invention relates generally to a method for increasing the temperature of a cooling fluid flowing through a fuel cell stack in a fuel cell system and, more particularly, to a method for increasing the temperature of a frozen or nearly frozen cooling fluid that cools a fuel cell stack at a system freeze start-up that includes limiting stack waste heat by preventing excessive power draw from the stack and heating the cooling fluid flowing through a coolant loop external to the fuel cell stack.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack by serial coupling to generate the desired power. For example, a typical fuel cell stack for a vehicle may have two hundred or more stacked fuel cells. The fuel cell stack receives a cathode input reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack. The stack also includes flow channels through which a cooling fluid flows.

The fuel cell stack includes a series of bipolar plates positioned between the several MEAs in the stack, where the bipolar plates and the MEAs are positioned between the two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

As mentioned above, a fuel cell stack includes cooling fluid flow channels, typically in the stack bipolar plates, that receive a cooling fluid that maintains the operating temperature of the fuel cell at a desired level. The cooling fluid is pumped through the stack and an external coolant loop outside of the stack by a high temperature pump, where a radiator typically cools the cooling fluid when it exits the stack. Temperature sensors are typically provided in the coolant loop external to the fuel cell stack to monitor the temperature of the cooling fluid as it exits and enters the stack to maintain a tight control of the stack temperature. The cooling fluid is typically a mixture of water and glycol that provides enhanced heat removal properties and reduces the freeze temperature of the cooling fluid.

In spite of the low temperature properties of the cooling fluid, it has been found that under certain low temperature conditions, the cooling fluid will become slushy and possibly freeze solid. If the vehicle or fuel cell system is started under these conditions, the cooling fluid may not flow through the flow channels in the stack and the coolant loop outside of the stack. When the cooling fluid is slushy, the small cooling fluid channels in the bipolar plates in the stack may prevent the cooling fluid from flowing. When the system is started and the cooling fluid does not properly flow, the stack waste heat causes the temperature of the stack to increase beyond its normal operating temperature, and possibly to temperatures that will damage fuel cell stack elements, such as the MEAs. Therefore, it is desirable to detect a low temperature cooling fluid at system start-up so as to prevent stack damage and increase the temperature of the cooling quickly so that it properly flows.

SUMMARY OF THE INVENTION

In accordance with the teachings of the present invention, a method is disclosed for increasing the temperature of a cooling fluid used to control the temperature of a fuel cell stack at a system freeze start-up. The method includes determining that the cooling fluid is frozen or nearly frozen, and if so, deactivating excessive power draw on the fuel cell stack to minimize stack waste heat and activating a cooling fluid heater to heat the cooling fluid. Once it is determined that the cooling fluid is not frozen or is flowing, then the method initiates a normal system start-up.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for increasing the temperature of a cooling fluid that controls the temperature of fuel cell stack at system freeze start-up is merely exemplary in nature, and is in no way intended to limit the invention or its applications or uses.

Figure 1:
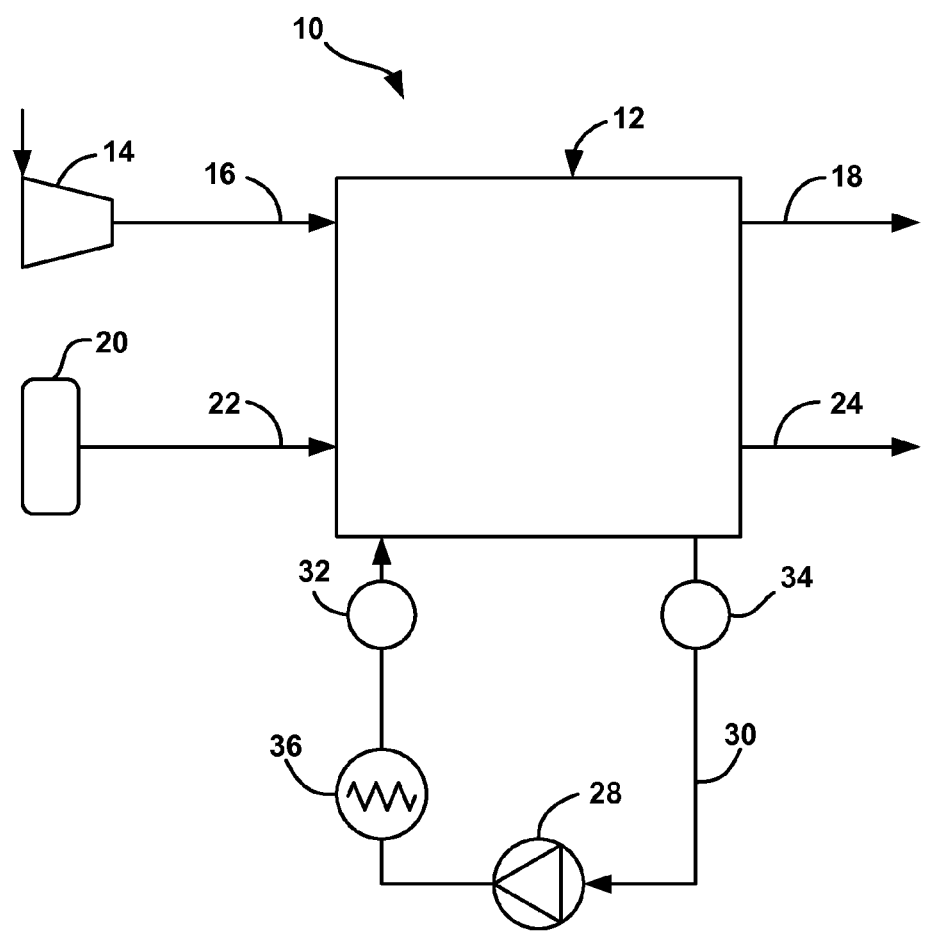
FIG. 1 is a schematic plan view of a fuel cell system including a fuel cell stack and a thermal sub-system.

FIG. 1 is a simplified schematic plan view of a fuel cell system 10 including a fuel cell stack 12. The fuel cell stack 12 includes a cathode side that receives air from a compressor 14 on a cathode input line 16 and provides a cathode exhaust gas on a cathode exhaust gas line 18. The fuel cell stack 12 also includes an anode side that receives a hydrogen gas from a hydrogen source 20, such as a high pressure tank, on an anode input line 22 and provides an anode exhaust gas on an anode exhaust gas line 24. The system 10 further includes a thermal sub-system that provides a cooling fluid flow to the fuel cell stack 12. The thermal sub-system includes a high temperature pump 28 that pumps the cooling fluid through a coolant loop 30 external to the fuel cell stack 12 and through the cooling fluid flow channels in the bipolar plates in the fuel cell stack 12. A temperature sensor 32 measures the temperature of the cooling fluid in the coolant loop 26 as it enters the fuel cell stack 12 and a temperature sensor 34 measures the temperature of the cooling fluid in the coolant loop 26 as it exits the fuel cell stack 12. A heater 36 is provided in the coolant loop 30 and can be used to increase the temperature of the cooling fluid flowing through the coolant loop 30, as will be discussed in detail below. The heater 36 can be any heater suitable for the purposes described herein, such as a resistive heater.

Figure 2:
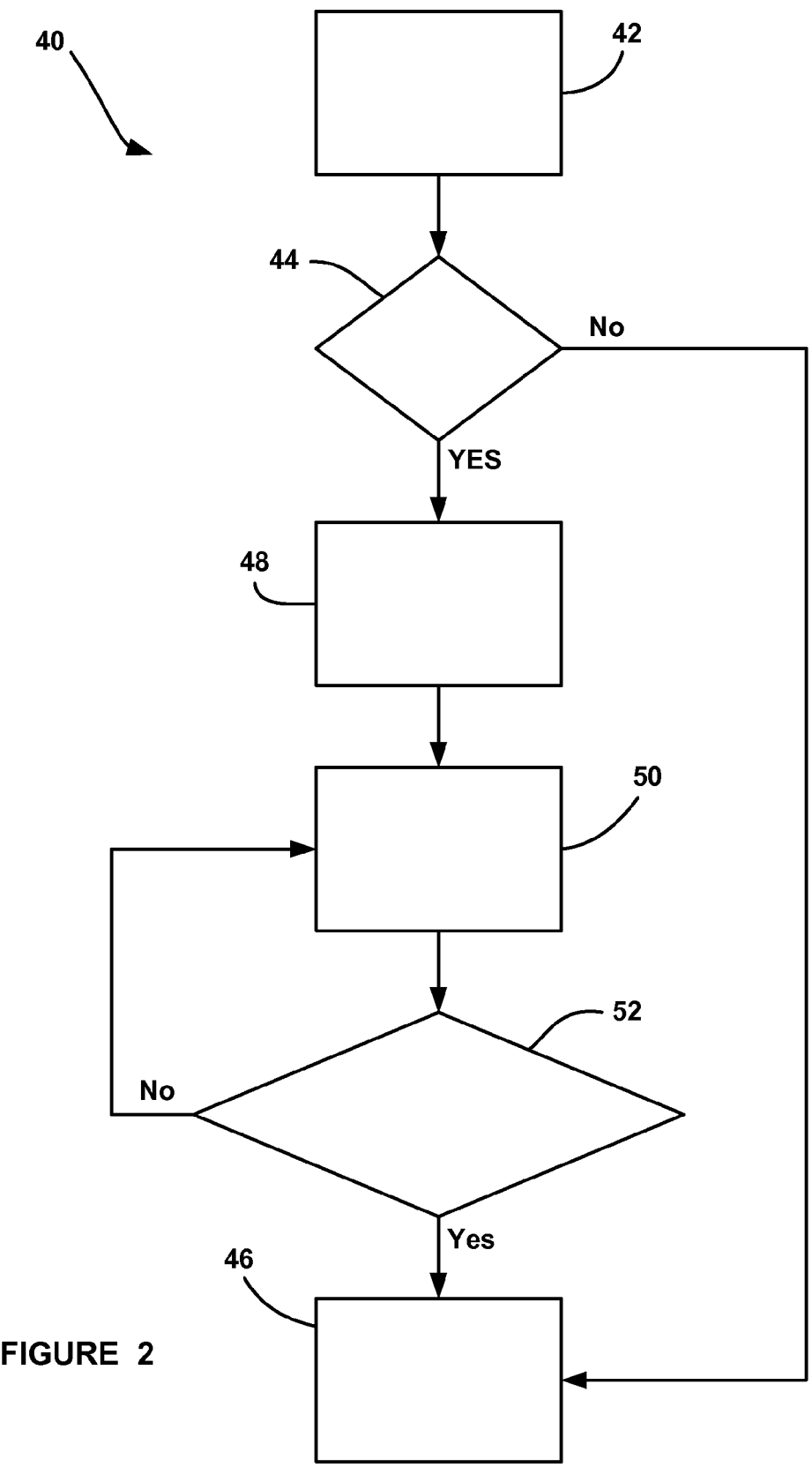
FIG. 2 is a flow chart diagram showing a process for heating a cooling fluid at system freeze-starts.

FIG. 2 is a flow chart diagram 40 showing a process for increasing the temperature of the cooling fluid flowing through the cooling fluid flow channels in the fuel cell stack 12 and the coolant loop 30 that is used to control the temperature of the fuel cell stack 12. When the fuel cell system 10 is turned on or activated, the system start-up algorithms will initiate a warm-up sequence at box 42 that is a normal procedure for quickly increasing the temperature of the stack 12 to its operating temperature so that it operates as efficiently as possible. The warm-up sequence determines whether the cooling fluid is frozen or nearly frozen at decision diamond 44. The present invention contemplates any suitable process for determining whether the cooling fluid is frozen or nearly frozen, where it would not be flowing through the cooling fluid channels of the fuel cell stack 12 and the coolant loop 30. A suitable example of an algorithm that detects whether the cooling fluid is frozen can be found in U.S. patent application Ser. No. 12/754,298, titled Method to Detect No Coolant Flow in a Fuel Cell System, filed Apr. 5, 2010, assigned to the assignee of this application and herein incorporated by reference. If a frozen or nearly frozen cooling fluid is not detected at the decision diamond 44, then the algorithm by-passes the steps for thawing the cooling fluid, and continues with a normal start-up procedure at box 46, including the warm-up sequence.

If the cooling fluid is frozen or nearly frozen at the decision diamond 44, the algorithm then deactivates or turns off some or all of the excessive loads that draw power from the fuel cell stack 12 so that the stack output current and the waste heat generated by the fuel cell stack 12 is minimal. Typically, the compressor 14 will draw power from the fuel cell stack 12, although it will probably be running at its lowest speed. Further, the pump 28 may be drawing power from the fuel cell stack 12, the injectors that inject hydrogen fuel into the anode side of the fuel cell stack 12 will be drawing power from the fuel cell stack 12, and the cooling fluid heater 36 may be drawing power from the fuel cell stack 12. Alternately, the heater 36 may be using high voltage battery power for its operation if the system is a hybrid system and includes such a battery. The stack power would need to be limited to an experimentally pre-determined model to allow it to power the auxiliary loads and cooling fluid heater 36, but not overheat or boil the cooling fluid, which will typically be 2-6 kW net power. However, other loads that are external to the fuel cell system, such as ancillary loads, traction motor, catalytic heating, cabin heating, etc., will be turned off.

Once the excessive power draw sources have been deactivated, the cooling fluid heater 36 is turned on to heat and thaw the cooling fluid at box 50. The cooling fluid heater 36 will need to be operated at an experimentally predetermined level high enough to warm the cooling fluid and melt any ice, but not so hot as to boil the cooling fluid. Typically, the cooling fluid heater 36 will be positioned in the coolant loop 30 at a location that is physically below the stack 12 so that heat generated by the heater 36 will rise within the coolant loop 30 towards the stack 12.

Once the cooling fluid heater 36 is turned on, the algorithm will periodically determine whether the stack temperature is greater than a predetermined freeze point or a cooling fluid flow is detected at decision diamond 52. The stack temperature can be monitored by either or both of the temperature sensors 32 and 34 to give an indication of the cooling fluid temperature, and thus, the stack temperature. The freeze point can be any suitable threshold for the particular system, and can be based on many factors, such as the number of cells in the stack 12, the water to glycol percentage mixture of the cooling fluid, etc. Cooling fluid flow can be detected by any suitable process, such as a flow meter, the speed of the pump 28, etc.

If the stack temperature is not greater than the freeze point threshold or the cooling fluid flow is not detected at the decision diamond 52, then the algorithm returns to the box 50 to maintain the cooling fluid heater 36 on, where the algorithm continues to periodically determine stack temperature and cooling fluid flow. Once the stack temperature is greater than the freeze point threshold or the cooling fluid flow is detected at the decision diamond 52, then the cooling fluid thaw portion of the algorithm is ended and the algorithm continues with a normal start-up sequence at the box 46.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for increasing the temperature of a cooling fluid flowing through a fuel cell stack and coolant loop external to the fuel cell stack at fuel cell system start-up, said method comprising:

starting the fuel cell stack so that it generates power and waste heat;

determining whether the cooling fluid is frozen or nearly frozen;

deactivating predetermined sources that draw power from the fuel cell stack if the cooling fluid is frozen or nearly frozen;

activating a cooling fluid heater to heat the cooling fluid in the coolant loop if the cooling fluid is frozen or nearly frozen;

determining whether the temperature of the stack is greater than a predetermined freeze point or a cooling fluid flow is detected through the coolant loop; and proceeding to a normal start-up procedure if the temperature of the stack is above the predetermined freeze point or the cooling fluid flow is detected.

2. The method according to claim 1 wherein activating the cooling fluid heater includes using fuel cell stack power to operate the cooling fluid heater.

3. The method according to claim 1 wherein activating the cooling fluid heater includes using battery power to operate the cooling fluid heater.

4. The method according to claim 1 wherein deactivating the sources includes limiting the power output of the fuel cell stack to be in the range of 2-6 kW.

5. The method according to claim 1 wherein determining whether the stack temperature is greater than the freeze point includes measuring the temperature of the cooling fluid using a temperature sensor as the cooling fluid enters the fuel cell stack from the coolant loop.

6. The method according to claim 1 wherein determining whether the stack temperature is greater than the freeze point includes measuring the temperature of the cooling fluid using a temperature sensor as the cooling fluid exits the fuel cell stack into the coolant loop.

7. The method according to claim 1 wherein the cooling fluid heater is located in the coolant loop.

8. The method according to claim 7 wherein the cooling fluid heater is positioned at a location lower than the fuel cell stack.

9. The method according to claim 1 wherein activating a cooling fluid heater includes activating a cooling fluid heater at a power level that prevents the cooling fluid from boiling.

10. A method for increasing the temperature of a cooling fluid flowing through a fuel cell stack and a coolant loop external to the fuel cell stack at fuel cell system start-up, said method comprising:
   starting the fuel cell stack so that it generates power and waste heat;
   determining whether the cooling fluid is frozen or nearly frozen;
   measuring the temperature of the cooling fluid in the coolant loop using a first temperature sensor at a location where the cooling fluid enters the fuel cell stack;
   measuring the temperature of the cooling fluid in the coolant loop using a second temperature sensor at a location where the cooling fluid exits the fuel cell stack;
   deactivating predetermined sources that draw power from the fuel cell stack if the cooling fluid is frozen or nearly frozen so that the power output of the fuel cell stack is in the range of 2-6 kW;
   activating a cooling fluid heater to heat the cooling fluid in the coolant loop if the cooling fluid is frozen or nearly frozen;
   determining whether the temperature of the fuel cell stack is greater than a predetermined freeze point or a cooling fluid flow is detected through the coolant loop, wherein determining the temperature of the fuel cell stack includes using the first and/or the second temperature sensors that measure the temperature of the cooling fluid into and out of the fuel cell stack; and
   continuing with a normal start-up procedure if the temperature of the fuel cell stack is greater than the predetermined freeze point or a cooling fluid flow is detected.

11. The method according to claim 10 wherein the cooling fluid heater is located in the coolant loop.

12. The method according to claim 11 wherein the cooling fluid heater is positioned at a location lower than the fuel cell stack.

13. The method according to claim 10 wherein activating a cooling fluid heater includes activating a cooling fluid heater at a power level that prevents the cooling fluid from boiling.

14. A system for increasing the temperature of a cooling fluid flowing through a fuel cell stack and a coolant loop external to the fuel cell stack at fuel cell system start-up, said system comprising:
   means for starting the fuel cell stack so that it generates power and waste heat;
   means for determining whether the cooling fluid is frozen or nearly frozen;
   means for deactivating predetermined sources that draw power from the fuel cell stack if the cooling fluid is frozen or nearly frozen;
   means for activating a cooling fluid heater to heat the cooling fluid in the coolant loop if the cooling fluid is frozen or nearly frozen;
   means for determining whether the temperature of the fuel cell stack is greater than a predetermined freeze point or a cooling fluid flow is detected through the coolant loop; and
   means for returning the fuel cell system to a normal start-up procedure if the temperature of the fuel cell stack is greater than the predetermined freeze point or the cooling fluid flow is detected.

15. The system according to claim 14 wherein the means for activating the cooling fluid heater uses fuel cell stack power to operate the cooling fluid heater.

16. The system according to claim 14 wherein the means for activating the cooling fluid heater uses battery power to operate the cooling fluid heater.

17. The system according to claim 14 wherein the means for deactivating the sources limits the power output of the fuel cell stack to be in the range of 2-6 kW.

18. The system according to claim 14 wherein the means for determining whether the stack temperature is greater than the freeze point measures the temperature of the cooling fluid using a temperature sensor as the cooling fluid enters the fuel cell stack from the coolant loop.

19. The system according to claim 14 wherein the means for determining whether the stack temperature is greater than the freeze point measures the temperature of the cooling fluid using a temperature sensor as the cooling fluid exits the fuel cell stack into the coolant loop.

20. The system according to claim 14 wherein the cooling fluid heater is located in the coolant loop.

* * * * *